(12) United States Patent
Yamamoto et al.

(10) Patent No.: US 11,260,929 B2
(45) Date of Patent: Mar. 1, 2022

(54) SADDLE RIDING VEHICLE

(71) Applicant: HONDA MOTOR CO., LTD., Tokyo (JP)

(72) Inventors: Kyotaro Yamamoto, Tokyo (JP); Kei Mayuzumi, Tokyo (JP); Masaomi Yamada, Tokyo (JP); Kazuya Sawasaki, Tokyo (JP); Souichiro Makino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 16/814,070

(22) Filed: Mar. 10, 2020

(65) Prior Publication Data

US 2020/0324846 A1 Oct. 15, 2020

(30) Foreign Application Priority Data

Apr. 11, 2019 (JP) .............................. JP2019-075862

(51) Int. Cl.
| | | |
|---|---|---|
| *B62K 11/04* | (2006.01) | |
| *B60K 13/04* | (2006.01) | |
| *B60K 5/12* | (2006.01) | |
| *B60K 11/04* | (2006.01) | |

(52) U.S. Cl.
CPC .............. *B62K 11/04* (2013.01); *B60K 5/125* (2013.01); *B60K 11/04* (2013.01); *B60K 13/04* (2013.01)

(58) Field of Classification Search
CPC .......... B62K 11/04; B60K 11/04; B60K 13/04
See application file for complete search history.

(56) References Cited

U.S. PATENT DOCUMENTS

| | | | | |
|---|---|---|---|---|
| 5,271,477 A | * | 12/1993 | Gekka | ........................ F01N 3/28 180/219 |
| 5,690,063 A | * | 11/1997 | Motoyama | .............. F02D 37/02 123/73 A |
| 5,946,908 A | * | 9/1999 | Motoyama | ............ F01N 13/008 60/314 |
| 8,690,192 B2 | * | 4/2014 | Yanagita | .................. B62J 23/00 280/851 |

(Continued)

FOREIGN PATENT DOCUMENTS

| | | |
|---|---|---|
| CN | 102700658 A | 10/2012 |
| JP | 2008-024291 A | 2/2008 |

(Continued)

OTHER PUBLICATIONS

Indian Office Action dated Apr. 20, 2021, 5 pages.
Chinese Office Action with English translation dated Oct. 11, 2021, 12 pages.

*Primary Examiner* — Minnah L Seoh
*Assistant Examiner* — Michael R Stabley
(74) *Attorney, Agent, or Firm* — Rankin, Hill & Clark LLP

(57) ABSTRACT

A saddle riding vehicle includes a body frame, an engine supported by the body frame, an exhaust sensor that detects exhaust air of the engine, and a radiator for the engine. The engine is supported by an engine hanger portion disposed in the body frame. The exhaust sensor is disposed on an exhaust pipe of the engine at a position on a front with respect to the engine hanger portion and is positioned underneath the radiator. At least a part of the exhaust sensor overlaps the engine hanger portion as viewed in a front view of a vehicle.

13 Claims, 8 Drawing Sheets

(56) References Cited

U.S. PATENT DOCUMENTS

| | | | | |
|---|---|---|---|---|
| 9,067,640 | B2* | 6/2015 | Tamura | B62K 11/04 |
| 9,174,694 | B2* | 11/2015 | Nakamura | B62K 11/04 |
| 9,834,272 | B2* | 12/2017 | Hosoya | B62J 23/00 |
| 10,066,536 | B2* | 9/2018 | Yamamoto | F01N 13/008 |
| 10,473,019 | B2* | 11/2019 | Matsumoto | F01N 1/084 |
| 2008/0236783 | A1* | 10/2008 | Morita | B60K 11/04 |
| | | | | 165/41 |
| 2012/0139226 | A1 | 6/2012 | Yanagita | |
| 2018/0202343 | A1* | 7/2018 | Matsumoto | F01N 1/083 |

FOREIGN PATENT DOCUMENTS

| | | |
|---|---|---|
| JP | 2012-121418 A | 6/2012 |
| JP | 2016-070160 | 5/2016 |

* cited by examiner

SADDLE RIDING VEHICLE

INCORPORATION BY REFERENCE

The present application claims priority under 35 U.S.C. § 119 to Japanese Patent Application No.2019-075862 filed on Apr. 11, 2019. The content of the application is incorporated herein by reference in its entirety.

TECHNICAL FIELD

The present invention relates to a saddle riding vehicle.

BACKGROUND ART

Conventionally, there is known a saddle riding vehicle that includes an engine supported by a body frame, an exhaust sensor that detects exhaust air of the engine, and a radiator. The engine is supported by an engine hanger portion disposed in the body frame. The exhaust sensor is disposed underneath the radiator and on a front side with respect to the engine hanger portion (for example, see Patent Literature 1). In Patent Literature 1, while the exhaust sensor is disposed in an exhaust outlet of the engine and is positioned on the front side with respect to the engine hanger portion, the exhaust sensor is displaced inward in a vehicle width direction from the engine hanger portion.

CITATION LIST

Patent Literature

[Patent Literature 1] JP-A No. 2016-070160

SUMMARY OF INVENTION

Technical Problem

Incidentally, in the above-described conventional saddle riding vehicle, since the exhaust sensor is disposed to protrude from the exhaust outlet of the engine, a degree of freedom of the arrangement of a component, such as the radiator arranged near the engine, is limited, and thus it is difficult to compactly arrange the component, such as the radiator. Further, as described above, conventionally, while arranging the exhaust sensor in the exhaust outlet ensures the exhaust sensor protected by the engine, it is desired that the exhaust sensor can be effectively protected even when the exhaust sensor is arranged at a position different from that of the exhaust outlet.

The present invention has been made in consideration of the above-described circumstances, and an object of the present invention is to compactly arrange a component, such as a radiator, and to ensure the effectively protected exhaust sensor, in a saddle riding vehicle.

Solution to Problem

A saddle riding vehicle includes a body frame (10), an engine (11) supported by the body frame (10), an exhaust sensor (65, 66) that detects exhaust air of the engine (11), and a radiator (40) for the engine (11). The engine (11) is supported by an engine hanger portion (51L, 51R) disposed in the body frame (10). The exhaust sensor (65, 66) is disposed on an exhaust pipe (61, 62) of the engine (11) at a position on a front with respect to the engine hanger portion (51L, 51R) and is positioned underneath the radiator (40). At least a part of the exhaust sensor (65, 66) overlaps the engine hanger portion (51L, 51R) as viewed in a front view of a vehicle.

Further, in the above-described configuration, the engine hanger portion (51L, 51R) may include a fastening portion (53) fastened to the engine (11) by inserting an engine fastener (54) through the fastening portion (53). The exhaust sensor (65, 66) may be arranged above the fastening portion (53).

Further, in the above-described configuration, the pair of left and right exhaust pipes (61 and 62) may be connected to the engine (11), and the exhaust sensor (65, 66) may be respectively disposed on the pair of left and right exhaust pipes (61 and 62). The respective exhaust sensor (65, 66) may be inserted into the pair of left and right exhaust pipes (61 and 62) from outside in a vehicle width direction.

Furthermore, in the above-described configuration, an outer end portion (65a, 66a) in the vehicle width direction of the exhaust sensor (65, 66) may be positioned inside in the vehicle width direction with respect to an end edge (40a, 40b) outside in the vehicle width direction of the radiator (40).

Further, in the above-described configuration, a lower end portion (41b) of the radiator (40) may include inclined surface (77L and 77R) inclined underneath a front above the exhaust sensor (65, 66).

Further, in the above-described configuration, the exhaust pipe (61, 62) may include underneath an extending pipe portion (61a, 62a) extending underneath the front from the engine (11). The inclined surface (77L, 77R) may be inclined underneath the front above the underneath extending pipe portion (61a, 62a) along the underneath extending pipe portion (61a, 62a). The exhaust sensor (65, 66) may be disposed on the underneath extending pipe portion (61a, 62a).

Further, in the above-described configuration, a horn (49) may be disposed underneath the exhaust sensor (65, 66). The exhaust sensor (65, 66) may be surrounded by the radiator (40), the engine hanger portion (51L, 51R), and the horn (49).

Further, in the above-described configuration, a catalytic device (63) that purifies exhaust air may be disposed underneath the exhaust sensor (65, 66). The exhaust sensor (65, 66) may be surrounded by the radiator (40), the engine hanger portion (51L, 51R), and the catalytic device (63).

Furthermore, in the above-described configuration, a recessed portion (75) recessed underneath may be disposed on an upper surface of the radiator (40). Harnesses (76a, 76b, and 76c) may be piped in the recessed portion (75).

Further, in the above-described configuration, the radiator (40) may be fastened to a vehicle body with a fastening member (71) in a front-rear direction. The fastening member (71) may be arranged between the pair of left and right exhaust pipes (61 and 62).

Further, in the above-described configuration, the exhaust pipe (61, 62) extending underneath the front from the engine (11) changes directions in a bent portion (61e, 62e) and extend downward to a rear. The exhaust sensor (65, 66) may be arranged upward on a rear of the bent portion (61e, 62e) as viewed in a side view of the vehicle.

Advantageous Effects of Invention

The saddle riding vehicle includes the body frame, the engine supported by the body frame, the exhaust sensor that detects exhaust air of the engine, and the radiator for the engine. The engine is supported by the engine hanger portion disposed in the body frame. The exhaust sensor is disposed on the exhaust pipe of the engine at a position on the front with respect to the engine hanger portion and is positioned underneath the radiator. At least a part of the exhaust sensor overlaps the engine hanger portion as viewed in the front view of the vehicle.

According to this configuration, since the exhaust sensor is disposed on exhaust pipe of the engine at position on the front with respect to the engine hanger portion, and is positioned underneath the radiator, the exhaust sensor is unlikely to become the hindrance of the arrangement of the radiator, and the radiator can be compactly arranged. Further, since the exhaust sensor is positioned underneath the radiator, and at least a part of the exhaust sensor overlaps the engine hanger portion as viewed in the front view of the vehicle, the radiator and the engine hanger portion can effectively protect the exhaust sensor.

Further, in the above-described configuration, the engine hanger portion may include the fastening portion fastened to the engine by inserting the engine fastener through the fastening portion. The exhaust sensor may be arranged on the upper side with respect to the fastening portion.

With this configuration, the fastening portion of the engine hanger portion can effectively protect the exhaust sensor from a downward side.

Further, in the above-described configuration, the pair of left and right exhaust pipes may be connected to the engine. The respective exhaust sensor may be disposed on the pair of left and right exhaust pipes. The respective exhaust sensor may be inserted into the pair of left and right exhaust pipes from the outside in the vehicle width direction.

With this configuration, the exhaust sensor is easily attached and removed from the outside in the vehicle width direction. Further, the arrangement of the exhaust sensor is symmetrical on a left and right, and thus the appearance property becomes good.

Furthermore, in the above-described configuration, the outer end portion in the vehicle width direction of the exhaust sensor may be positioned inside in the vehicle width direction with respect to the end edge outside in the vehicle width direction of the radiator.

With this configuration, the radiator can effectively protect the exhaust sensor, and the exhaust sensor can be arranged to be inconspicuous, so as to ensure the appearance property.

Further, in the above-described configuration, the lower end portion of the radiator may include inclined surface inclined underneath the front on the upper side of the exhaust sensor.

With this configuration, the exhaust sensor can be arranged close to the lower end portion of the radiator, the exhaust sensor can be compactly arranged, and the radiator easily protects the exhaust sensor.

Further in the above-described configuration, the exhaust pipe may include the underneath extending pipe portion extending underneath the front from the engine. The inclined surface may be inclined underneath the front on the upper side of the underneath extending pipe portion along the underneath extending pipe portion. The exhaust sensor may be disposed on the underneath extending pipe portion.

With this configuration, the exhaust pipe and the exhaust sensor can be arranged close to the lower end portion of the radiator and the engine. The exhaust pipe and the exhaust sensor can be compactly arranged, and the radiator easily protects the exhaust sensor. Further, the radiator can be arranged close to the engine, a bulge of the radiator toward a forward side can be decreased.

Further, in the above-described configuration, the horn may be disposed underneath the exhaust sensor, and the exhaust sensor may be surrounded by the radiator, the engine hanger portion, and the horn.

With this configuration, the radiator, the engine hanger portion, and the horn can effectively protect the exhaust sensor.

Further, in the above-described configuration, the catalytic device that purifies exhaust air may be disposed underneath the exhaust sensor, and the exhaust sensor may be surrounded by the radiator, the engine hanger portion, and the catalytic device.

With this configuration, the radiator, the engine hanger portion, and the catalytic device can effectively protect the exhaust sensor.

Furthermore, in the above-described configuration, the recessed portion recessed underneath may be disposed on the upper surface of the radiator, and the harness may be piped in the recessed portion.

According to this configuration, disposing the harness in the recessed portion on the upper surface of the radiator causes the harness to be unlikely to become noticeable. The appearance property becomes good, and the harness and the radiator can be compactly arranged up and down.

Further, in the above-described configuration, the radiator may be fastened to the vehicle body with the fastening members in the front-rear direction. The fastening members may be arranged between the pair of left and right exhaust pipes.

With this configuration, using the fastening members with which the radiator is fastened in the front-rear direction ensures the compact fixing, and the left and right exhaust pipes hide the fastening members to ensure the improved appearance property.

Further, in the above-described configuration, the exhaust pipe extending underneath the front from the engine may change the directions in the bent portion and extend downward to the rear. As viewed in the side view of the vehicle, the exhaust sensor may be arranged upward on the rear of the bent portion.

With this configuration, the bent portion of the exhaust pipe can protect the exhaust sensor from the underneath on the front.

DESCRIPTION OF EMBODIMENTS

The following describes an embodiment of the present invention with reference to the drawings. Note that, in the description, descriptions on directions such as front and rear, left and right, and upper and lower are identical to directions with respect to a vehicle body insofar as descriptions are not particularly given. A reference sign FR indicated in each drawing indicates a front of the vehicle body, a reference sign UP indicates an upper side of the vehicle body, and a reference sign LH indicates a left of the vehicle body.

Figure 1:
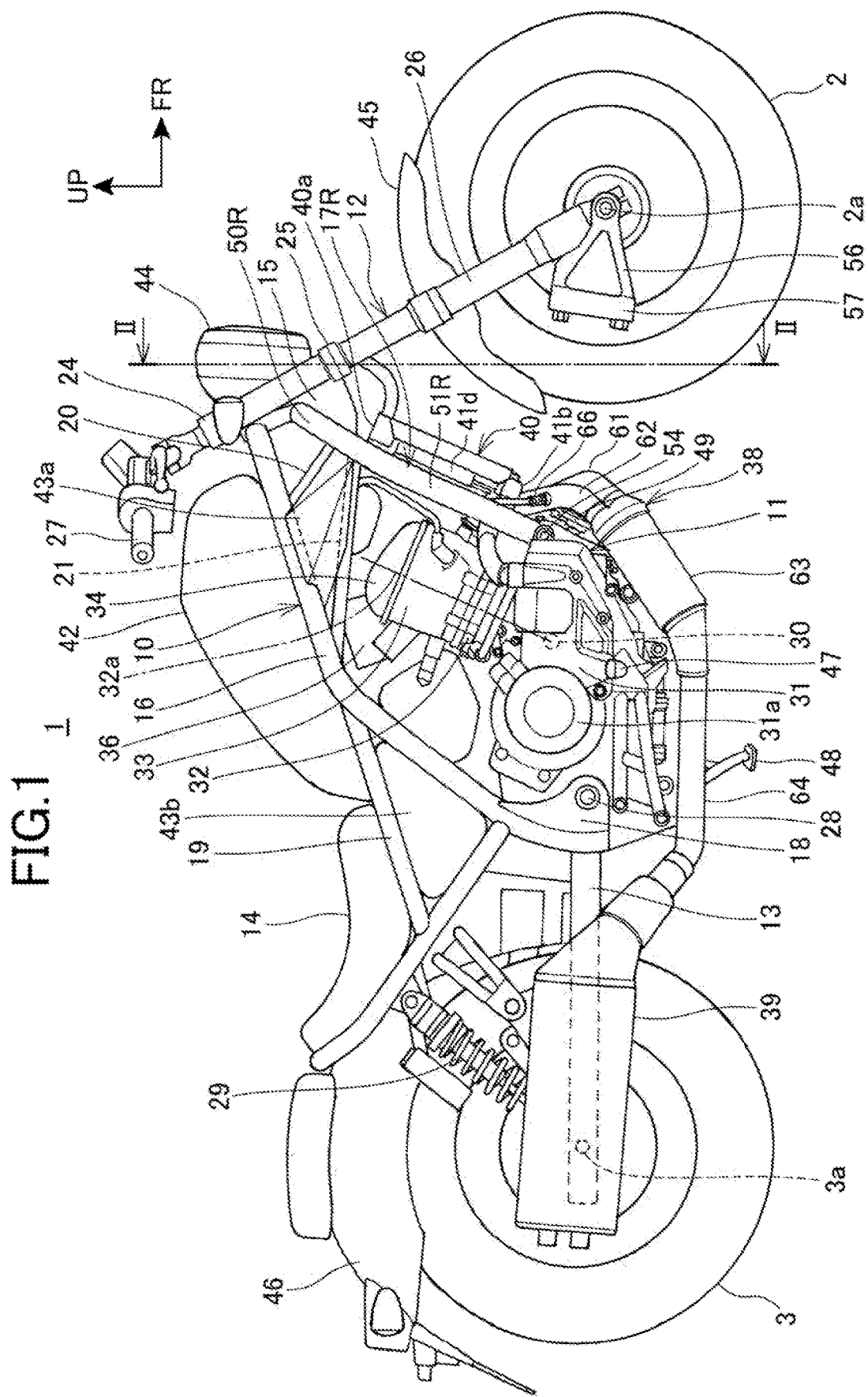
FIG. 1 is a right side view of a motorcycle according to an embodiment of the present invention.
Figure 2:
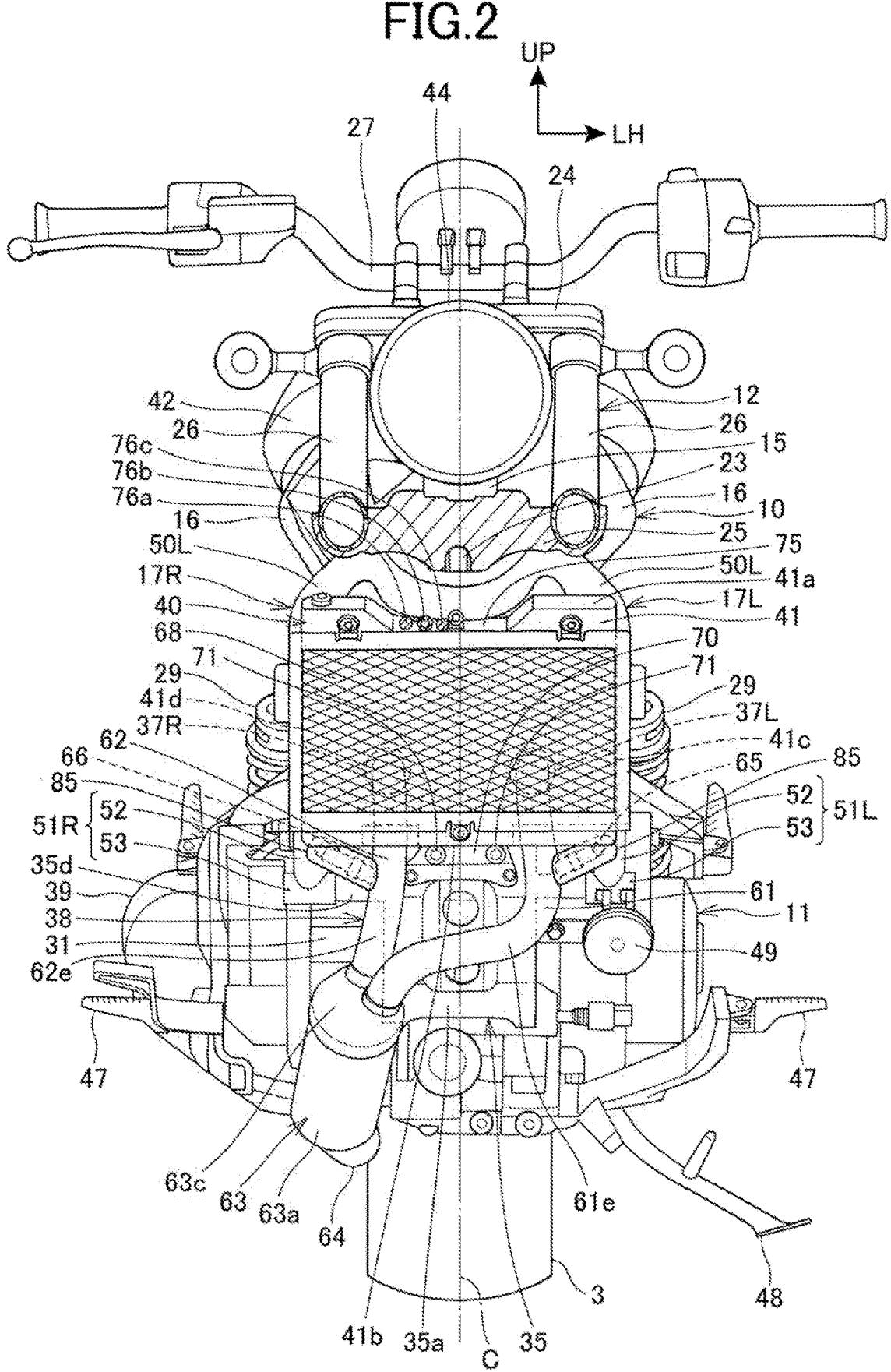
FIG. 2 is a cross-sectional view taken along the line II-II in FIG. 1.

FIG. 1 is a right side view of a motorcycle 1 according to an embodiment of the present invention. FIG. 2 is a cross-sectional view taken along the line II-II in FIG. 1.

The motorcycle 1 is a vehicle where an engine 11 as a power unit is supported by a body frame 10, a steering system 12 that steerably supports a front wheel 2 is steerably supported on a front end of the body frame 10, and a swing arm 13 that supports a rear wheel 3 is disposed on a rear portion side of the body frame 10.

The motorcycle 1 is a saddle riding vehicle on which an occupant is seated as straddling a seat 14. The seat 14 is disposed on an upper side of the rear portion of the body frame 10.

The body frame 10 includes a head pipe 15, a pair of left and right main frames 16, a pair of left and right down frames 17L and 17R, a pair of left and right pivot frames 18, and a seat frame 19. The head pipe 15 is disposed on the front end of the body frame 10. The pair of left and right main frames 16 extends downward to a rear from the head pipe 15. The pair of left and right down frames 17L and 17R extends downward to the rear from an underneath of the main frames 16, in the head pipe 15. The pair of left and right pivot frames 18 extends underneath from rear ends of the main frames 16. The seat frame 19 extends rearward from rear portions of the main frames 16 and upper portions of the pivot frames 18.

Further, the body frame 10 includes a pair of left and right first reinforcing frames 20 and a pair of left and right second reinforcing frames 21. The pair of left and right first reinforcing frames 20 connects upper portions of the down frames 17L and 17R to upper portions of the main frames 16. Underneath the first reinforcing frames 20, the pair of left and right second reinforcing frames 21 connects the upper portions of the down frames 17L and 17R to the main frames 16.

The steering system 12 includes a steering shaft 23, a top bridge 24, a bottom bridge 25, a pair of left and right front forks 26, and a handlebar 27 for steering. The steering shaft 23 is turnably journaled to the head pipe 15. The top bridge 24 is fixed to an upper end of the steering shaft 23. The bottom bridge 25 is fixed to a lower end of the steering shaft 23. The pair of left and right front forks 26 is supported by the top bridge 24 and the bottom bridge 25. The handlebar 27 is fixed to the top bridge 24.

The top bridge 24 extends in a vehicle width direction on an upper side of the head pipe 15 from the steering shaft 23 to be coupled to upper end portions of the left and right front forks 26.

The bottom bridge 25 extends in the vehicle width direction underneath the head pipe 15 from the steering shaft 23 to be coupled to the left and right front forks 26.

The front forks 26 are arranged to be tilted rearward as viewed in a side view of the vehicle. The front wheel 2 is journaled to an axle 2a bridged between lower end portions of the left and right front forks 26.

The swing arm 13 is journaled to a pivot shaft 28 that is supported by the left and right pivot frames 18. The pivot shaft 28 horizontally extends in the vehicle width direction. The swing arm 13 has a front end portion journaled to the pivot shaft 28 and swings up and down around the pivot shaft 28.

The rear wheel 3 is journaled to an axle 3a disposed in a rear end portion of the swing arm 13.

The motorcycle 1 includes a pair of left and right rear suspensions 29 that is bridged between the rear end portion of the swing arm 13 and the seat frame 19.

The engine 11 is arranged between the down frames 17L and 17R and the pivot frames 18 in a vehicle front-rear direction underneath the main frame 16 to be fixed to the body frame 10.

The engine 11 includes a crankcase 31, a cylinder 32, a cylinder head 33, and a head cover 34. The crankcase 31 supports a crankshaft 30 horizontally extending in the vehicle width direction (left-right direction). The cylinder 32 is disposed in an upper portion of a front portion of the crankcase 31. The cylinder head 33 is joined to an upper surface of the cylinder 32. The head cover 34 is mounted to an upper surface of the cylinder head 33. A cylinder axis 32a of the cylinder 32 is tilted forward in a vertical direction.

An intake device 36 of the engine 11 is connected to an intake port on a rear surface of the cylinder head 33.

Exhaust ports 37L and 37R of the engine 11 are provided as a pair at the right and left on a front surface portion of the cylinder head 33.

An exhaust device of the engine 11 includes an exhaust pipe portion 38 and a muffler 39. The exhaust pipe portion 38 is connected to the exhaust ports 37L and 37R. The muffler 39 is connected to a downstream end of the exhaust pipe portion 38.

The crankcase 31 has a rear portion as a transmission case portion 31a that houses a transmission. An output of the engine 11 is transmitted to the rear wheel 3 by a drive chain (not illustrated) connecting to an output shaft of the above-described transmission to the rear wheel 3.

A radiator 40 through which a cooling water of the engine 11 passes is arranged on a front of the engine 11 underneath the head pipe 15.

A fuel tank 42 is arranged between the head pipe 15 and the seat 14 on an upper side of the main frame 16.

A vehicle body cover of the motorcycle 1 includes a front side cover 43a and a rear side cover 43b. The front side cover 43a covers between the first reinforcing frames 20 and the second reinforcing frames 21. The rear side cover 43b covers between the seat frame 19 and the main frames 16. The second reinforcing frame 21 is arranged in an upper side with respect to the head cover 34 and approximately horizontally extends in the vehicle front-rear direction.

A headlight 44 is arranged on a front of the head pipe 15 and above the bottom bridge 25 and is supported by the steering system 12.

A front fender 45 that covers the front wheel 2 from an upper side is supported by the front forks 26.

The rear wheel 3 is covered with a rear fender 46 arranged on a rear of the seat 14 from an upper side.

A pair of left and right steps 47 on which feet of the occupant of the seat 14 are placed is arranged on a front of the left and right pivot frames 18.

A side kickstand 48 is supported by a lower end portion of the pivot frame 18 on a left side.

A horn 49 that emits a horn sound is arranged on a front surface side of the engine 11.

In a rear of the lower end portion of the front fork 26, a caliper bracket 56 is disposed. To the caliper bracket 56, a brake caliper 57 of a braking device of the front wheel 2 is fixed.

Figure 3:
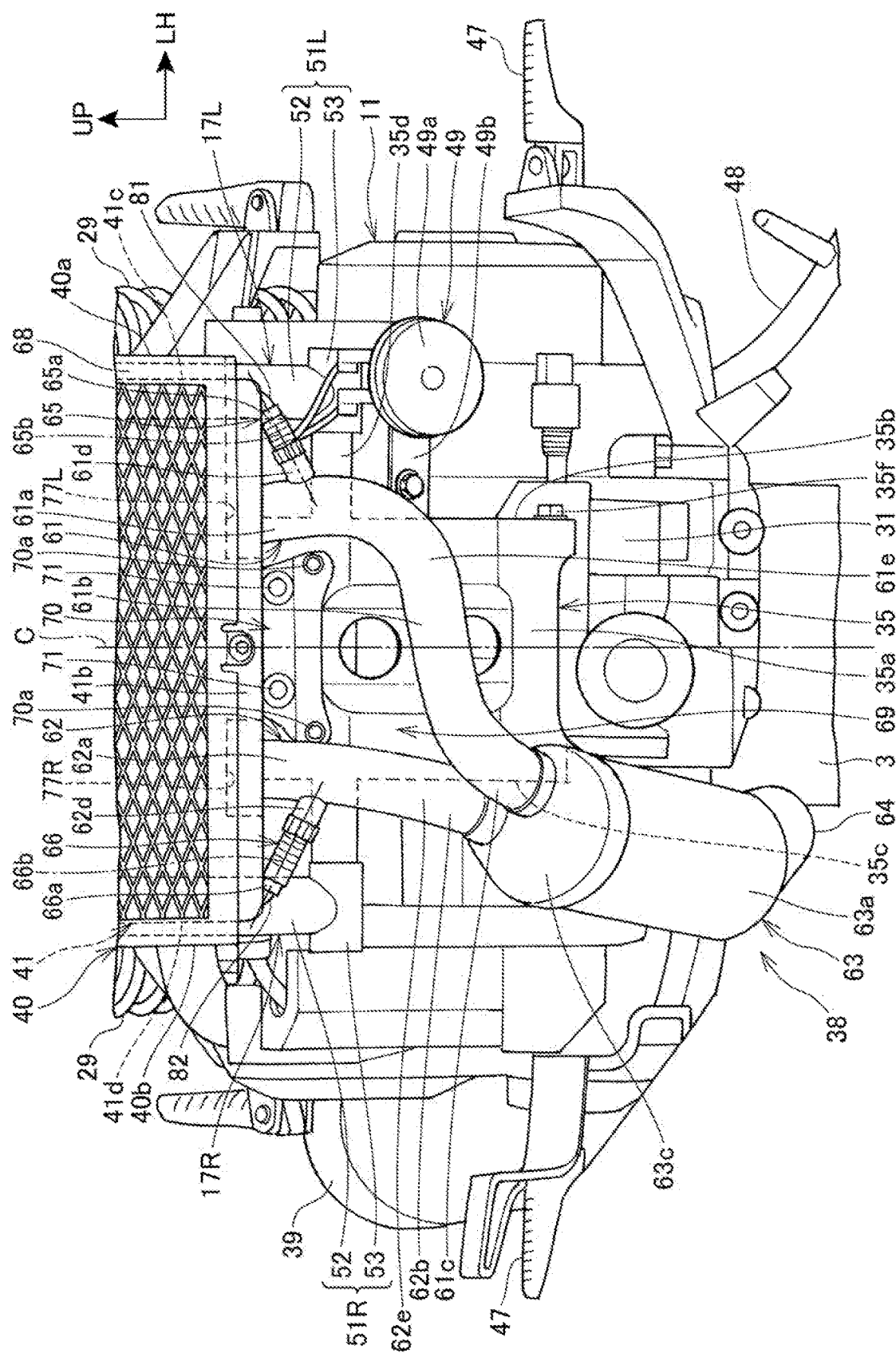
FIG. 3 is a front view of a supporting structure of an engine and a peripheral portion of an exhaust pipe portion viewed from a forward side.
Figure 4:
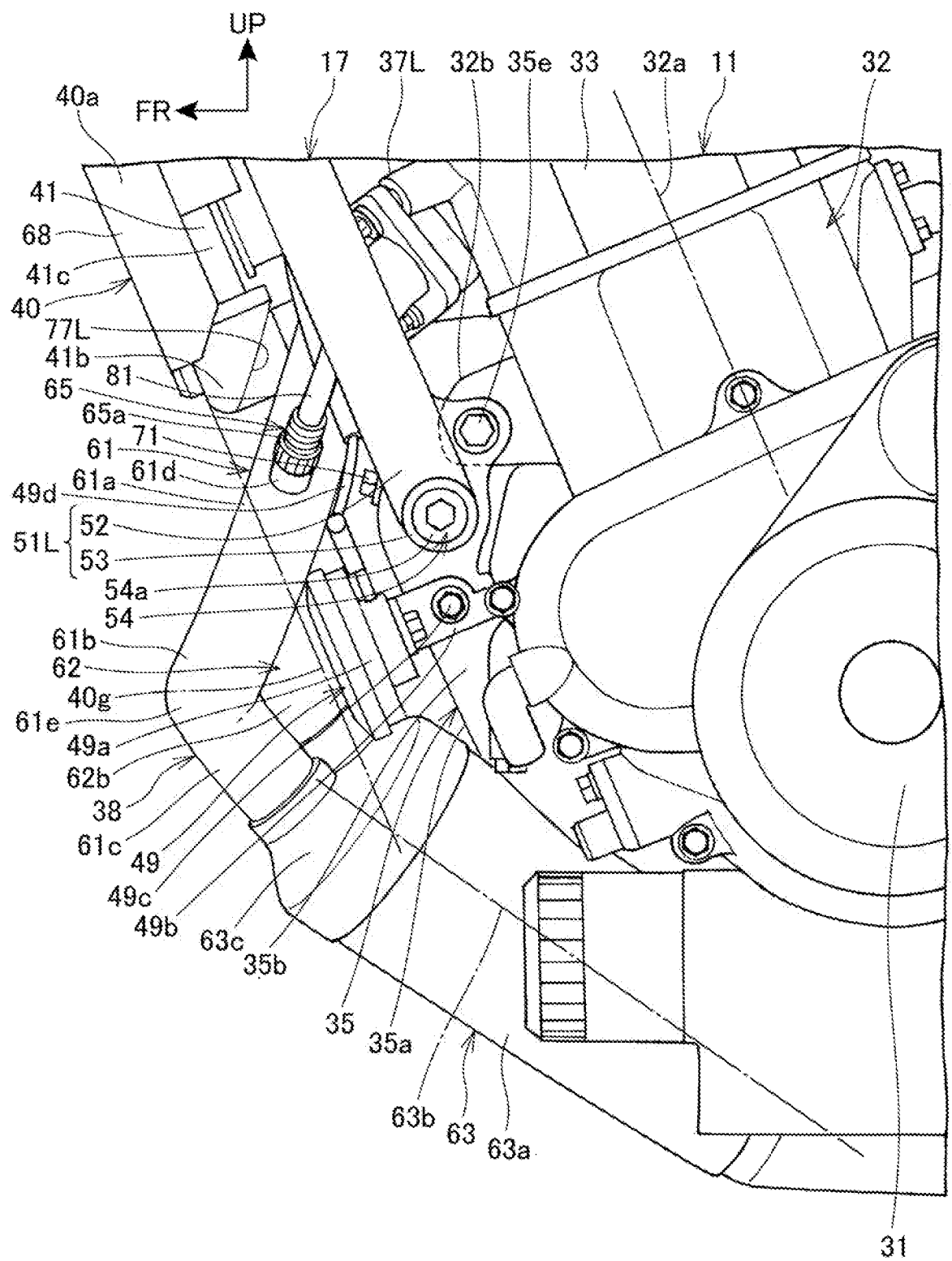
FIG. 4 is a left side view of the supporting structure of the engine and the peripheral portion of the exhaust pipe portion.
Figure 5:
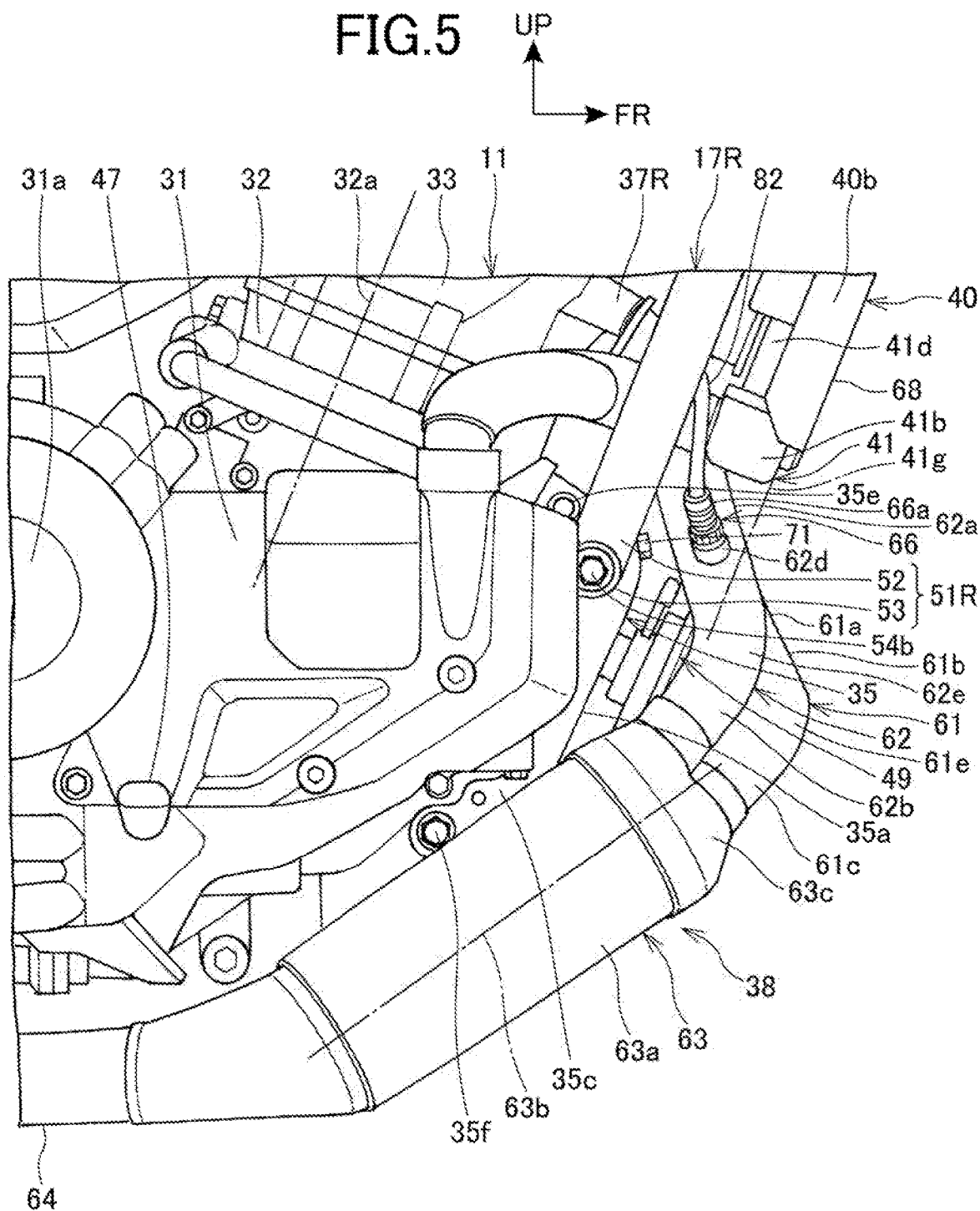
FIG. 5 is a right side view of the supporting structure of the engine and the peripheral portion of the exhaust pipe portion.

FIG. 3 is a front view of a supporting structure of the engine 11 and a peripheral portion of the exhaust pipe portion 38 viewed from a forward side. FIG. 4 is a left side view of the supporting structure of the engine 11 and the peripheral portion of the exhaust pipe portion 38. FIG. 5 is a right side view of the supporting structure of the engine 11 and the peripheral portion of the exhaust pipe portion 38.

With reference to FIG. 2 to FIG. 5, the down frames 17L and 17R include enlarged width portions 50L and 50R, and engine hanger portions 51L and 51R. The enlarged width portions 50L and 50R extend so as to be gradually positioned on an outside in the vehicle width direction as heading downward to the rear from the head pipe 15. The engine hanger portions 51L and 51R extend downward to the rear from the enlarged width portions 50L and 50R so as to be approximately parallel to one another. The engine hanger portions 51L and 51R support a front portion of the engine 11.

On a front surface side of the crankcase 31, the engine 11 includes a bracket 35 to which the engine hanger portions 51L and 51R are fastened.

The engine hanger portions 51L and 51R support the front portion of the engine 11 so as to suspend the front portion of the engine 11 via the bracket 35. The left and right engine hanger portions 51L and 51R are approximately and symmetrically formed.

The respective engine hanger portions 51L and 51R include downward extending portions 52 and fastening portions 53. The downward extending portions 52 include pipe members that constitute the enlarged width portions 50L and 50R and directly extend underneath. The fastening portions 53 are disposed on lower ends of the downward extending portions 52.

The engine hanger portions 51L and 51R are positioned on a front of the cylinder 32, the cylinder head 33, and the head cover 34 and are arranged to be tilted forward along the cylinder axis 32a as viewed in the side view of the vehicle.

The engine hanger portions 51L and 51R extend in an up-down direction from joined portions of front ends of the respective left and right second reinforcing frames 21 and the down frames 17L and 17R to a position on a front of the crankcase 31.

The respective left and right engine hanger portions 51L and 51R are fastened to the bracket 35 of the engine 11 with an engine fastener 54 inserted through the fastening portions 53 from the outside in the vehicle width direction. Here, the engine fastener 54 is configured from a bolt 54a and a nut 54b.

In detail, the fastening portion 53 is a tubular member extending in the vehicle width direction and includes a receiving portion (not illustrated) and a hole portion (not illustrated), inside a tube. The receiving portion receives the engine fastener 54 in an axial direction. The hole portion penetrates through this receiving portion and is inserted through by the bolt 54a. The fastening portion 53 is formed to be longer in the axial direction than a diameter of the downward extending portion 52 and protrudes outside and inside in the vehicle width direction with respect to a lower end portion of the downward extending portion 52.

The bracket 35, which is included in the engine 11, includes a front wall portion 35a, a pair of left and right sidewall portions 35b and 35c, and an engine hanger coupling portion 35d (FIG. 3). The front wall portion 35a is approximately rectangular and covers the front surface of the crankcase 31 from the front. The pair of left and right sidewall portions 35b and 35c extends rearward from both side edges in the vehicle width direction of the front wall portion 35a. The engine hanger coupling portion 35d couples the left and right sidewall portions 35b and 35c in the vehicle width direction in a rear of the front wall portion 35a.

The engine hanger coupling portion 35d has a pipe shape that penetrates through the sidewall portions 35b and 35c in the vehicle width direction, and both end portions of the engine hanger coupling portion 35d protrude outside in the vehicle width direction from the sidewall portions 35b and 35c.

The engine 11 includes a bracket fixing portion 32b protruding forward from a front surface of the cylinder 32. The bracket 35 has an upper portion fastened to the bracket fixing portion 32b with a bracket fastener 35e (FIG. 4) inserted through the sidewall portions 35b and 35c from the vehicle width direction.

Further, the bracket 35 has a lower portion fastened to a front end portion of a lower portion of the crankcase 31 with a bracket fastener 35f (FIG. 5) inserted through the sidewall portions 35b and 35c in the vehicle width direction.

The bracket 35 of the engine 11 is arranged between the left and right engine hanger portions 51L and 51R, and is fastened to the engine hanger portions 51L and 51R with the engine fastener 54.

In detail, the bracket 35 includes the engine hanger coupling portion 35d sandwiched between the left and right fastening portions 53 of the engine hanger portions 51L and 51R, and is fastened with the engine fastener 54 inserted through the left and right fastening portions 53 and the engine hanger coupling portion 35d. The engine fastener 54 is positioned underneath a front of the bracket fastener 35e in the upper portion of the bracket 35.

With reference to FIG. 2 to FIG. 5, the exhaust pipe portion 38 includes one-side exhaust pipe 61 (exhaust pipe), other-side exhaust pipe 62 (exhaust pipe), a catalytic device 63, and a coupling pipe 64. The one-side exhaust pipe 61 extends underneath from the exhaust port 37L on one (left side) of the left and the right. The other-side exhaust pipe 62 extends underneath from the exhaust port 37R on the other (right side) of the left and the right. The catalytic device 63 is connected to downstream ends of exhaust flows of the one-side exhaust pipe 61 and the other-side exhaust pipe 62. The coupling pipe 64 extends rearward from the catalytic device 63 to be connected to the muffler 39.

In the one-side exhaust pipe 61, an exhaust sensor 65 that detects an exhaust air of the one-side exhaust pipe 61 is disposed. In the other-side exhaust pipe 62, an exhaust sensor 66 that detects an exhaust air of the other-side exhaust pipe 62 is disposed.

The muffler 39 is arranged to be displaced to the other side of the left and the right from a center line C in a vehicle width direction of the motorcycle 1, and is positioned on a rightward side of the rear wheel 3.

Similarly to the muffler 39, the catalytic device 63 is arranged to be displaced to the other side of the left and the right from the center line C in the vehicle width direction.

The catalytic device 63 includes a tubular catalytic case 63a and a catalyst body (not illustrated). The catalyst body is housed inside the catalytic case 63a. On the above-described catalyst body, a catalyst material (for example, platinum, rhodium, and palladium) that decomposes exhaust gas components is supported.

As viewed in the side view of the vehicle, the catalytic device 63 is arranged to have a posture inclined underneath the front portion of the crankcase 31 such that an axis 63b of the catalytic case 63a is tilted upward to the front.

The catalytic case 63a to which the downstream ends of the one-side exhaust pipe 61 and the other-side exhaust pipe 62 are connected has a front end portion 63c. The front end portion 63c is positioned on the front of the crankcase 31 and is positioned underneath with respect to the engine hanger portions 51L and 51R.

In detail, the catalytic device 63 has a front portion positioned immediately below the engine hanger portion 51R on the right side, and covers at least a part of the fastening portion 53 of the engine hanger portion 51R from an underneath.

In the vehicle width direction, the exhaust port 37L is positioned between the center line C and the engine hanger portion 51L on the left side. The one-side exhaust pipe 61 includes an underneath extending pipe portion 61a, a lateral side extending pipe portion 61b, and a connecting pipe portion 61c. The underneath extending pipe portion 61a extends underneath the front from the exhaust port 37L along the center line C. The lateral side extending pipe portion 61b is bent in the vehicle width direction and is across the center line C to extend on the catalytic device 63 side from the underneath extending pipe portion 61a. The connecting pipe portion 61c is bent downward to the rear from the lateral side extending pipe portion 61b to be connected to the front end portion 63c of the catalytic case 63a. The lateral side extending pipe portion 61b extends to the left and the right on a front of the bracket 35.

Further, as viewed in the side view of the vehicle, the one-side exhaust pipe 61 includes the underneath extending pipe portion 61a extending underneath the front from the exhaust port 37L and change the direction in a bent portion 61e to cause the connecting pipe portion 61c to extend downward to the rear. The bent portion 61e is configured by the lateral side extending pipe portion 61b and a part of the connecting pipe portion 61c.

In the vehicle width direction, the exhaust port 37R is positioned between the center line C and the engine hanger portion 51R on the right side. The other-side exhaust pipe 62 includes an underneath extending pipe portion 62a and a connecting pipe portion 62b. The underneath extending pipe portion 62a extends underneath the front from the exhaust port 37R along the center line C. The connecting pipe portion 62b is bent downward to the rear from the underneath extending pipe portion 62a to be connected to the front end portion 63c of the catalytic case 63a.

Further, as viewed in the side view of the vehicle, the other-side exhaust pipe 62 includes the underneath extending pipe portion 62a extending underneath the front from the exhaust port 37R and changes the direction in a bent portion 62e to cause the connecting pipe portion 62b to extend downward to the rear.

With reference to FIG. 1 to FIG. 5, the radiator 40 includes a radiator body 41 through which the cooling water passes, and a radiator cover 68. The radiator cover 68 covers a front surface of the radiator body 41.

The radiator body 41 is an approximately rectangular plate-shaped member and is arranged to have a plate thickness direction oriented in the vehicle front-rear direction. As illustrated in FIG. 1, the radiator body 41 is disposed underneath the head pipe 15 on the front of the engine 11 and the engine hanger portions 51L and 51R. The radiator body 41 is arranged to be tilted forward along the engine hanger portions 51L and 51R, as viewed in the side view of the vehicle. As viewed in the side view of the vehicle, the radiator body 41 is approximately parallel to the engine hanger portions 51L and 51R. Further, the radiator body 41 is positioned on an upper side with respect to the catalytic device 63.

The radiator cover 68 is an approximately rectangular netlike member fastened to the front surface of the radiator body 41 and is formed slightly larger than the radiator body 41 in the vehicle width direction.

The radiator body 41 has an upper end portion 41a positioned at a proximity of a lower end portion of the head pipe 15.

The radiator body 41 has a lower end portion 41b that is positioned underneath the exhaust ports 37L and 37R and is positioned above the fastening portions 53 as lower end portions of the engine hanger portions 51L and 51R.

The radiator body 41 has a lower portion that covers the exhaust ports 37L and 37R and upper portions of the one-side exhaust pipe 61 and the other-side exhaust pipe 62 from the front.

As illustrated in FIG. 2, a size in the vehicle width direction of the radiator body 41 is approximately equal to a width between the left and right engine hanger portions 51L and 51R, and end portions 41c and 41d in the vehicle width direction of the radiator body 41 cover the engine hanger portions 51L and 51R from the front, respectively.

Figure 6:
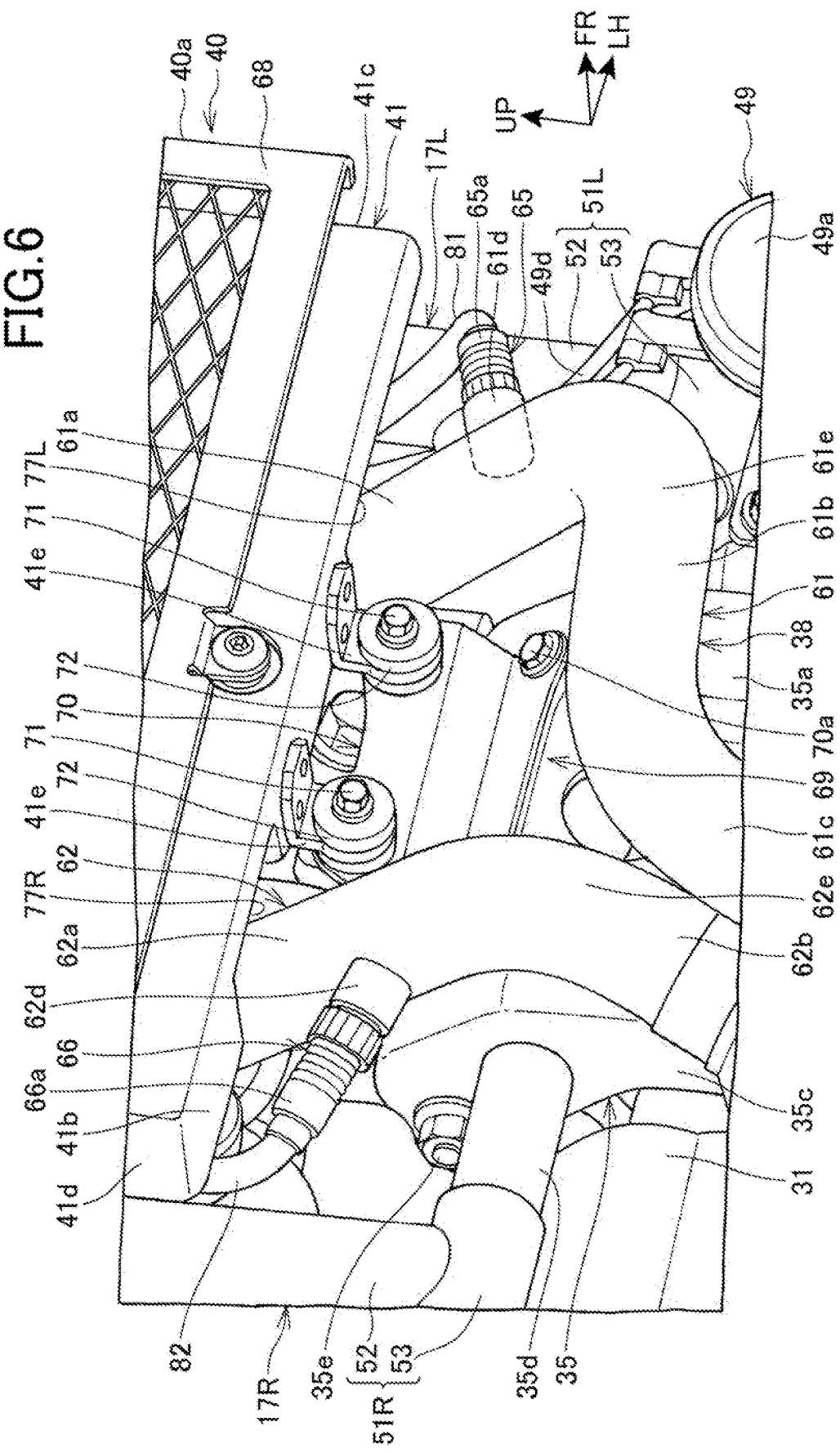
FIG. 6 is a perspective view of a part underneath a radiator viewed from the forward side.

FIG. 6 is a perspective view of a part underneath the radiator 40 viewed from the forward side.

With reference to FIG. 3 and FIG. 6, the bracket 35 of the engine 11 has the upper portion to which a radiator supporting member 70 that supports a lower portion of the radiator 40 is mounted.

The radiator supporting member 70 has a plate shape extending upward from the front wall portion 35a of the bracket 35. The radiator supporting member 70 is fastened to an upper portion of the front wall portion 35a with a plurality of fixtures 70a that are inserted through a lower portion of the radiator supporting member 70 from the front.

In a front view of FIG. 3, the radiator supporting member 70 is arranged in a region 69 surrounded by the underneath extending pipe portion 61a, the underneath extending pipe portion 62a, the lateral side extending pipe portion 61b, and the lower end portion 41b of the radiator body 41.

The radiator body 41 includes a plurality of lower stay portions 41e extending underneath from a lower surface of the lower end portion 41b, in a center portion in the vehicle width direction. The lower stay portions 41e are arranged in a position between the left and right underneath extending pipe portions 61a and 62a.

The radiator body 41 is fastened to an upper portion of the radiator supporting member 70 with lower fastening members 71 (fastening members) inserted through the respective lower stay portions 41e from the front. Between the lower stay portions 41e and the radiator supporting member 70, tubular vibration control members 72 through which the lower fastening members 71 are inserted are interposed.

The lower fastening member 71 is a bolt that is fastened to the radiator supporting member 70 in a direction where an axis of a screw portion is oriented in the vehicle front-rear direction. Thus, the radiator 40 is fixable to the vehicle body side in a compact structure in the vehicle width direction.

The lower fastening members 71 and the fixtures 70a are arranged between the left and right underneath extending pipe portions 61a and 62a and between the lateral side extending pipe portion 61b and the lower end portion 41b of the radiator body 41. The lower fastening members 71 and the fixtures 70a are exposed forward between the underneath extending pipe portions 61*a* and 62*a*. Thus, making the lower fastening members 71 and the fixtures 70*a* to be unnoticeable ensures the improved appearance property, and the lower fastening member 71 and the fixture 70*a* can be accessed from the front to have the good maintainability.

Figure 7:
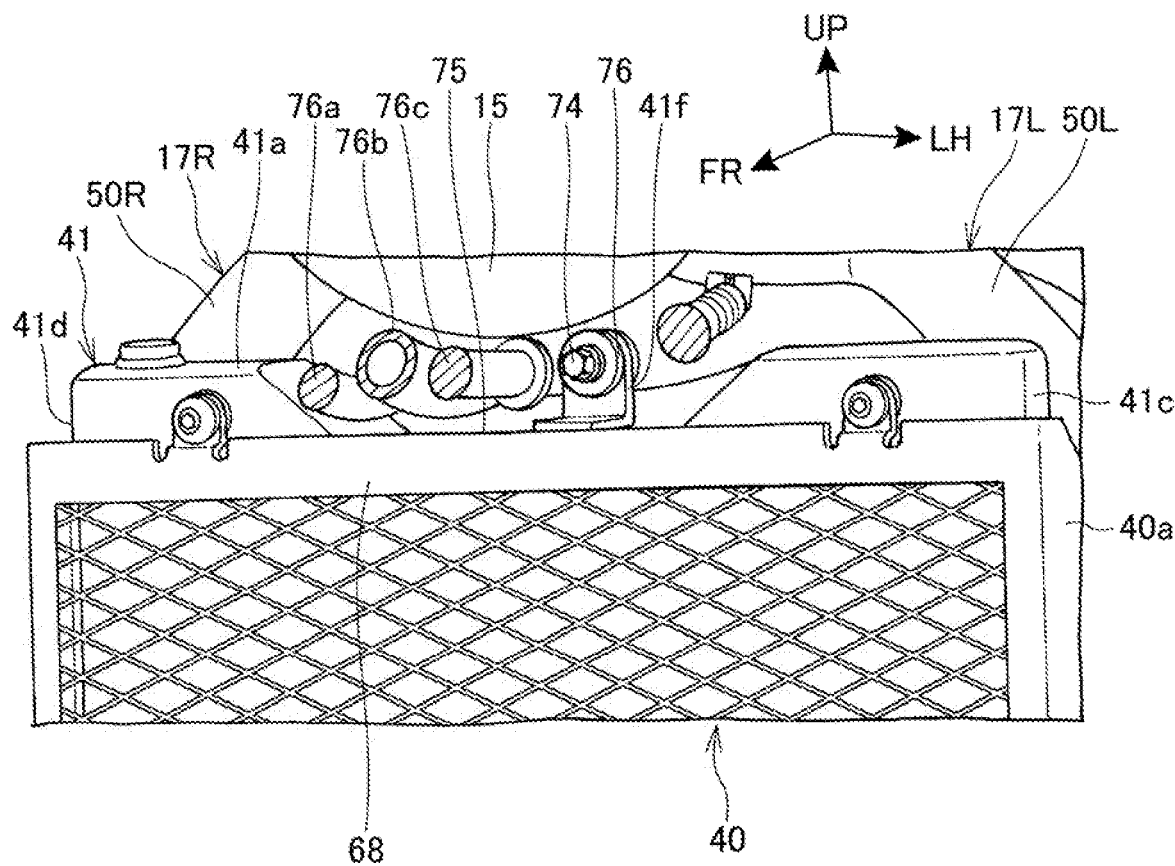
FIG. 7 is a perspective view of a mounting structure of an upper portion of the radiator viewed from the forward side.

FIG. 7 is a perspective view of a mounting structure of an upper portion of the radiator 40 viewed from the forward side.

The radiator body 41 includes an upper stay portion 41*f* extending upward from an upper surface of the upper end portion 41*a*. The upper stay portion 41*f* is disposed in a center portion in the vehicle width direction of the radiator body 41.

The radiator body 41 is fastened to the vehicle body with an upper fastening member 74 inserted through the upper stay portion 41*f* from the front. The upper fastening member 74 is a bolt that is arranged in a direction where an axis of a screw portion is oriented in the vehicle front-rear direction, and is fastened to a stay (not illustrated) disposed in, for example, an upper portion of the body frame 10.

Between the upper stay portion 41*f* and the vehicle body, a tubular vibration control member 76 through which the upper fastening member 74 is inserted is interposed.

On the upper surface of the upper end portion 41*a* of the radiator body 41, a recessed portion 75 where this upper surface is recessed underneath is disposed.

The recessed portion 75 is disposed in the center portion in the vehicle width direction of the radiator body 41. In the vehicle width direction, the recessed portion 75 is positioned between the left and right down frames 17L and 17R. The recessed portion 75 is positioned underneath the lower end portion of the head pipe 15 and is recessed underneath so as to avoid the lower end portion of the head pipe 15.

The upper stay portion 41*f* is disposed in the recessed portion 75 and extends upward from the recessed portion 75.

From the vehicle body on a rear of the radiator 40, a plurality of harnesses 76*a*, 76*b*, and 76*c* are piped to a front of the radiator 40. The plurality of harnesses 76*a*, 76*b*, and 76*c* pass inside the recessed portion 75 back and forth underneath the lower end portion of the head pipe 15. Thus, it is unlikely to view the harnesses 76*a*, 76*b*, and 76*c* from an outside, and the appearance property becomes good. Further, the harnesses 76*a*, 76*b*, and 76*c* and the radiator 40 can be compactly arranged in the up-down direction.

The harnesses 76*a*, 76*b*, and 76*c* are linear members and are, for example, an electric wire of an electric component, a cable for manipulation, a brake pipe, a pipe of a cooling water, and the like.

Figure 8:
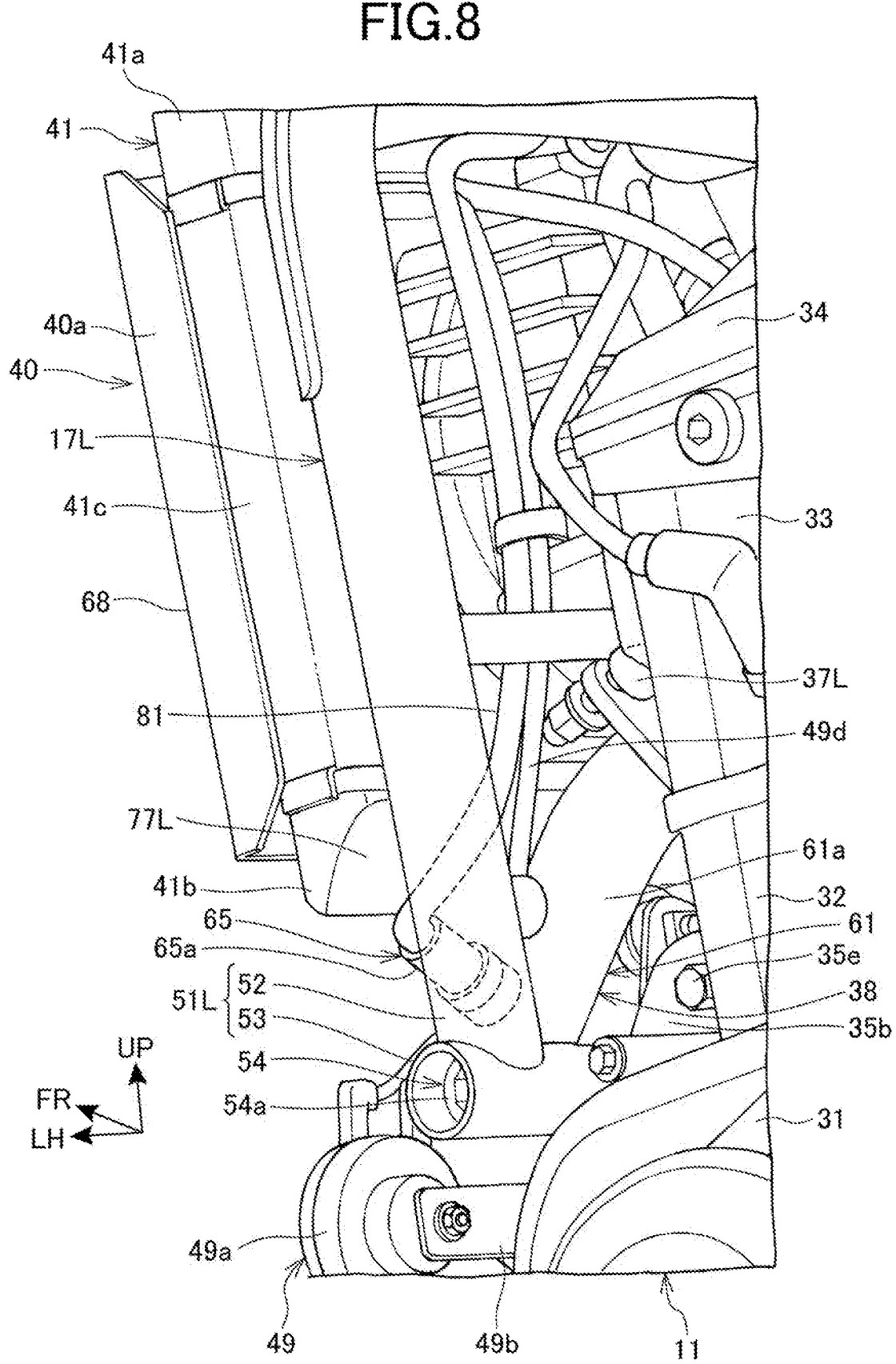
FIG. 8 is a perspective view of an engine hanger portion on a left side and a peripheral portion of the radiator viewed from a rear lateral side.

FIG. 8 is a perspective view of the engine hanger portion 51L on the left side and a peripheral portion of the radiator 40 viewed from a rear lateral side.

With reference to FIG. 4, FIG. 6, and FIG. 8, in the lower surface of the lower end portion 41*b* of the radiator body 41, a plurality of inclined surfaces 77L and 77R inclined toward the underneath of the front as viewed in the side view of the vehicle are disposed in the vehicle width direction. The inclined surfaces 77L and 77R have recessed shapes where the lower end portion 41*b* has a rear portion recessed toward an upward side. The inclined surfaces 77L and 77R are arranged outside the vehicle width direction with respect to the lower stay portions 41*e*, which are arranged in a center.

The inclined surface 77L on the left side is positioned on an upper side of the underneath extending pipe portion 61*a* of the one-side exhaust pipe 61 and is inclined underneath the front along the underneath extending pipe portion 61*a*. The underneath extending pipe portion 61*a* has an upper portion adjacent to the inclined surface 77L from the rear to extend underneath along the inclined surface 77L. Thus, the one-side exhaust pipe 61 and the radiator 40 are closely disposed to ensure the compact arrangement.

The inclined surface 77R on the right side is positioned on an upper side of the underneath extending pipe portion 62*a* of the other-side exhaust pipe 62 and is inclined underneath the front along the underneath extending pipe portion 62*a*. The underneath extending pipe portion 62*a* has an upper portion adjacent to the inclined surface 77R from the rear to extend underneath along the inclined surface 77R. Thus, the other-side exhaust pipe 62 and the radiator 40 are closely disposed to ensure the compact arrangement.

With reference to FIG. 3 and FIG. 4, the horn 49 is arranged to be displaced to a side opposite to the catalytic device 63 from the center line C in the vehicle width direction.

In outside parts of the one-side exhaust pipe 61 and the bracket 35, the horn 49 is positioned immediately below the engine hanger portion 51L on the left side to cover a part of the engine hanger portion 51L on the left side from the underneath. The horn 49 is disposed underneath with respect to the radiator 40. The horn 49 is positioned underneath the front with respect to the fastening portion 53 of the engine hanger portion 51L.

The horn 49 includes a circular-plate-shaped horn main body 49*a* and a mounting portion 49*b*. The mounting portion 49*b* extends from the horn main body 49*a* to the rear. The horn 49 is fastened to the sidewall portion 35*b* on a left side of the bracket 35 with a horn fastener 49*c* inserted through the mounting portion 49*b* from the outside in the vehicle width direction.

As viewed in the side view of the vehicle, the horn 49 is arranged to be tilted forward such that the horn main body 49*a* is approximately parallel to the engine hanger portion 51L.

An electric wire 49*d* of the horn 49 extends upward from the horn main body 49*a*.

With reference to FIG. 3 to FIG. 6, and FIG. 8, the underneath extending pipe portion 61*a* of the one-side exhaust pipe 61 has an outer surface on which a sensor mounting portion 61*d* is disposed. The exhaust sensor 65 is mounted to the sensor mounting portion 61*d*. The sensor mounting portion 61*d* has a tube shape protruding outside in the vehicle width direction.

Further, the underneath extending pipe portion 62*a* of the other-side exhaust pipe 62 has an outer surface on which a sensor mounting portion 62*d* is disposed. The exhaust sensor 66 is mounted to the sensor mounting portion 62*d*. The sensor mounting portion 62*d* has a tube shape protruding outside in the vehicle width direction.

The exhaust sensors 65 and 66 have bar shapes and include a detecting unit (not illustrated) that detects an oxygen concentration of exhaust air on distal end portions. The exhaust sensors 65 and 66 have base end portions 65*a* and 66*a* (outer end portions) to which connection cables 81 and 82 are connected, respectively. Detection results of the exhaust sensors 65 and 66 are transmitted to a control unit (not illustrated) that controls the engine 11 and the like via the connection cables 81 and 82.

As illustrated in FIG. 2, as a chipping guard from the front, sensor guards 85 that cover the exhaust sensors 65 and 66 themselves may be disposed on the one-side exhaust pipe 61 and the other-side exhaust pipe 62. The sensor guards 85 are not illustrated in the drawings other than FIG. 2.

The exhaust sensor 65 is inserted into the sensor mounting portion 61*d* from the outside in the vehicle width direction, and the above-described detecting unit is arranged inside the one-side exhaust pipe 61. That is, the exhaust sensor 65 is mounted to the one-side exhaust pipe 61 in a direction where the base end portion 65a is an outer end portion in the vehicle width direction of the exhaust sensor 65.

The exhaust sensor 66 is inserted into the sensor mounting portion 62d from the outside in the vehicle width direction, and the above-described detecting unit is arranged inside the other-side exhaust pipe 62. That is, the exhaust sensor 66 is mounted to the other-side exhaust pipe 62 in a direction where the base end portion 66a is an outer end portion in the vehicle width direction of the exhaust sensor 66.

As viewed in a front view of the vehicle in FIG. 3, the exhaust sensors 65 and 66 are arranged and inclined such that the exhaust sensors 65 and 66 are gradually positioned upward as heading toward the outside in the vehicle width direction. The exhaust sensors 65 and 66 have axes 65b and 66b oriented to the outside in the vehicle width direction and the upper side.

Further, as illustrated in FIG. 4, the exhaust sensors 65 and 66 are arranged and inclined such that the exhaust sensors 65 and 66 are gradually positioned rearward as heading toward the outside in the vehicle width direction.

The exhaust sensor 65 on the left side is arranged underneath the radiator 40 and on a front of the engine hanger portion 51L.

In detail, as illustrated in FIG. 3, the exhaust sensor 65 protrudes outside in the vehicle width direction from the one-side exhaust pipe 61 toward the engine hanger portion 51L. As viewed in the front view of the vehicle, the base end portion 65a of the exhaust sensor 65 overlaps the downward extending portion 52 of the engine hanger portion 51L from the front.

Thus, the radiator 40 can protect the exhaust sensor 65 from the upper side, and the engine hanger portion 51L can protect the exhaust sensor 65 from the rear.

As illustrated in FIG. 3, as viewed in the front view of the vehicle, the base end portion 65a of the exhaust sensor 65 is positioned inside in the vehicle width direction with respect to an end edge 40a outside in the vehicle width direction of the radiator 40. Thus, the radiator 40 can protect the exhaust sensor 65 from the outside in the vehicle width direction. Here, the end edge 40a is an end edge on one side of a left and right of the radiator cover 68 and extends in a straight line in the vertical direction as viewed in the front view of the vehicle.

Further, as viewed in the side view of the vehicle, the exhaust sensor 65 is arranged rearward with respect to an extended line 41g where the front surface of the radiator body 41 is extended underneath. Thus, the radiator body 41 can protect the exhaust sensor 65 from the forward side.

Further, the exhaust sensor 65 is arranged immediately above the horn 49 and is positioned upward on the front with respect to the fastening portion 53 of the engine hanger portion 51L. Thus, the fastening portion 53 can protect the exhaust sensor 65 from a downward side on the rear.

The exhaust sensor 65 is positioned immediately below the inclined surface 77L of the radiator body 41 and overlaps the inclined surface 77L viewed from the underneath. Thus, the exhaust sensor 65 can approach the radiator body 41 in the up-down direction to ensure the compact arrangement of the exhaust sensor 65.

The connection cable 81 of the exhaust sensor 65 passes immediately below the inclined surface 77L and extends upward on the rear to be piped upward along a rear surface of the radiator 40.

The exhaust sensor 65 is surrounded by the radiator 40 on the upper side, the horn 49 on a lower side, the engine hanger portion 51L on the rear, and the one-side exhaust pipe 61 on a lateral side. Thus, the radiator 40, the horn 49, the engine hanger portion 51L, and the one-side exhaust pipe 61 can effectively protect the exhaust sensor 65.

As viewed in the side view of the vehicle, the exhaust sensor 65 is arranged upward on a rear of the bent portion 61e of the one-side exhaust pipe 61. Thus, the bent portion 61e can protect the exhaust sensor 65 from the underneath on the front.

The exhaust sensor 66 on the right side is arranged underneath the radiator 40 and on a front of the engine hanger portion 51R.

In detail, as illustrated in FIG. 3, the exhaust sensor 66 protrudes outside in the vehicle width direction from the other-side exhaust pipe 62 toward the engine hanger portion 51R. As viewed in the front view of the vehicle, the base end portion 66a of the exhaust sensor 66 overlaps the downward extending portion 52 of the engine hanger portion 51R from the front.

Thus, the radiator 40 can protect the exhaust sensor 66 from the upper side, and the engine hanger portion 51R can protect the exhaust sensor 66 from the rear.

As illustrated in FIG. 3, as viewed in the front view of the vehicle, the base end portion 66a of the exhaust sensor 66 is positioned inside the vehicle width direction with respect to an end edge 40b outside in the vehicle width direction of the radiator 40. Thus, the radiator 40 can protect the exhaust sensor 66 from the outside in the vehicle width direction. Here, the end edge 40b is an end edge on the other side of the left and right of the radiator cover 68 and extends in a straight line in the vertical direction as viewed in the front view of the vehicle.

Further, as viewed in the side view of the vehicle, the exhaust sensor 66 is arranged rearward with respect to the extended line 41g of the front surface of the radiator body 41. Thus, the radiator body 41 can protect the exhaust sensor 66 from the forward side.

Further, the exhaust sensor 66 is arranged immediately above the front end portion 63c of the catalytic device 63 and is positioned upward on the front with respect to the fastening portion 53 of the engine hanger portion 51R. Thus, the fastening portion 53 can protect the exhaust sensor 66 from a downward side on the rear.

The connection cable 82 of the exhaust sensor 66 passes immediately below the radiator body 41 and extends upward on the rear to be piped upward along a rear surface of the radiator 40.

The exhaust sensor 66 is surrounded by the radiator 40 on the upper side, the catalytic device 63 on the lower side, the engine hanger portion 51R on the rear, and the other-side exhaust pipe 62 on the lateral side. Thus, the radiator 40, the catalytic device 63, the engine hanger portion 51R, and the other-side exhaust pipe 62 can effectively protect the exhaust sensor 66.

As viewed in the side view of the vehicle, the exhaust sensor 66 is arranged upward on a rear of the bent portion 62e of the other-side exhaust pipe 62. Thus, the bent portion 62e can protect the exhaust sensor 66 from the underneath on the front.

Further, since the radiator 40 extends underneath up to a position at which the exhaust ports 37L and 37R are covered from the front to ensure a capacity, the engine 11 can be efficiently cooled. In this embodiment, since the exhaust sensors 65 and 66 are disposed on the one-side exhaust pipe 61 and the other-side exhaust pipe 62, underneath the radiator 40, the exhaust sensors 65 and 66 are unlikely to become a hindrance compared with, for example, the structure of disposing the exhaust sensors 65 and 66 on the exhaust ports 37L and 37R. The radiator 40 can be arranged close to the exhaust ports 37L and 37R, and an amount by which the radiator 40 bulges toward the forward side can be decreased. Thus, the radiator 40 can be compactly arranged on the front and the rear, and a distance between the radiator 40 and the front wheel 2 can be ensured.

As described above, according to the embodiment to which the present invention is applied, the motorcycle 1 includes the body frame 10, the engine 11 supported by the body frame 10, the exhaust sensors 65 and 66 that detect exhaust air of the engine 11, and the radiator 40 for the engine 11. The engine 11 is supported by the engine hanger portions 51L and 51R disposed in the body frame 10. The exhaust sensors 65 and 66 are disposed on the one-side exhaust pipe 61 and the other-side exhaust pipe 62 of the engine 11 at positions on the front with respect to the engine hanger portions 51L and 51R, and are positioned underneath the radiator 40. As viewed in the front view of the vehicle, at least a part of the exhaust sensors 65 and 66 overlaps the engine hanger portions 51L and 51R.

According to this configuration, since the exhaust sensors 65 and 66 are disposed on the one-side exhaust pipe 61 and the other-side exhaust pipe 62 of the engine 11 at the positions on the front with respect to the engine hanger portions 51L and 51R, and are positioned underneath the radiator 40, the exhaust sensors 65 and 66 are unlikely to become the hindrance of the arrangement of the radiator 40, and the radiator 40 can be compactly arranged. Further, since the exhaust sensors 65 and 66 are positioned underneath the radiator 40, and at least a part of the exhaust sensors 65 and 66 overlaps the engine hanger portions 51L and 51R as viewed in the front view of the vehicle, the radiator 40 and the engine hanger portions 51L and 51R can effectively protect the exhaust sensors 65 and 66.

Further, the engine hanger portions 51L and 51R include the fastening portions 53 fastened to the engine 11 by inserting the engine fastener 54 through the fastening portions 53. The exhaust sensors 65 and 66 are arranged on the upper side with respect to the fastening portions 53.

According to this configuration, the fastening portions 53 of the engine hanger portions 51L and 51R can effectively protect the exhaust sensors 65 and 66 from the downward side.

Further, to the engine 11, the pair of left and right one-side exhaust pipe 61 and other-side exhaust pipe 62 are connected. The exhaust sensors 65 and 66 are disposed on the pair of left and right one-side exhaust pipe 61 and other-side exhaust pipe 62, respectively. The respective exhaust sensors 65 and 66 are inserted into the one-side exhaust pipe 61 and the other-side exhaust pipe 62 from the outside in the vehicle width direction.

According to this configuration, the exhaust sensors 65 and 66 are easily attached and removed from the outside in the vehicle width direction. Further, the arrangement of the exhaust sensors 65 and 66 are symmetrical on the left and right, and thus the appearance property becomes good.

Furthermore, the base end portions 65*a* and 66*a*, which are the outer end portions in the vehicle width direction of the exhaust sensors 65 and 66, are positioned inside in the vehicle width direction with respect to the end edges 40*a* and 40*b* outside in the vehicle width direction of the radiator 40.

With this configuration, the radiator 40 can effectively protect the exhaust sensors 65 and 66, and the exhaust sensors 65 and 66 can be arranged to be inconspicuous so as to ensure the appearance property.

Further, the lower end portion 41*b* of the radiator 40 includes the inclined surfaces 77L and 77R inclined underneath the front on an upper side of the exhaust sensors 65 and 66.

According to this configuration, the exhaust sensors 65 and 66 can be arranged close to the lower end portion 41*b* of the radiator 40, the exhaust sensors 65 and 66 can be compactly arranged, and the radiator 40 easily protects the exhaust sensors 65 and 66.

Further, the one-side exhaust pipe 61 and the other-side exhaust pipe 62 include the underneath extending pipe portions 61*a* and 62*a* extending underneath the front from the engine 11. The inclined surfaces 77L and 77R are inclined underneath the front on an upper side of the underneath extending pipe portions 61*a* and 62*a* along the underneath extending pipe portions 61*a* and 62*a*. The exhaust sensors 65 and 66 are disposed on the underneath extending pipe portions 61*a* and 62*a*.

According to this configuration, the one-side exhaust pipe 61, the other-side exhaust pipe 62, and the exhaust sensors 65 and 66 can be arranged close to the lower end portion 41*b* of the radiator 40 and the engine 11. The one-side exhaust pipe 61, the other-side exhaust pipe 62, and the exhaust sensors 65 and 66 can be compactly arranged, and the radiator 40 easily protects the exhaust sensors 65 and 66. Further, the radiator 40 can be arranged close to the engine 11, the bulge of the radiator 40 toward the forward side can be decreased.

Further, underneath the exhaust sensor 65, the horn 49 is disposed, and the exhaust sensor 65 is surrounded by the radiator 40, the engine hanger portion 51L, and the horn 49.

With configuration, the radiator 40, the engine hanger portion 51L, and the horn 49 can effectively protect the exhaust sensor 65.

Further, underneath the exhaust sensor 66, the catalytic device 63 that purifies exhaust air is disposed, and the exhaust sensor 66 is surrounded by the radiator 40, the engine hanger portion 51R, and the catalytic device 63.

With this configuration, the radiator 40, the engine hanger portion 51R, and the catalytic device 63 can effectively protect the exhaust sensor 66.

Furthermore, on an upper surface of the radiator 40, the recessed portion 75 recessed underneath is disposed, and the harnesses 76*a*, 76*b*, and 76*c* are piped in the recessed portion 75.

With this configuration, disposing the harnesses 76*a*, 76*b*, and 76*c* in the recessed portion 75 on the upper surface of the radiator 40 causes the harnesses 76*a*, 76*b*, and 76*c* to be unlikely to become noticeable. The appearance property becomes good, and the harnesses 76*a*, 76*b*, and 76*c* and the radiator 40 can be compactly arranged up and down.

Further, the radiator 40 is fastened to the vehicle body with the lower fastening members 71 in a front-rear direction. The lower fastening members 71 are arranged between the pair of left and right one-side exhaust pipe 61 and other-side exhaust pipe 62.

With this configuration, using the lower fastening members 71 with which the radiator 40 is fastened in the front-rear direction ensures the compact fixing, and the left and right one-side exhaust pipe 61 and other-side exhaust pipe 62 hide the lower fastening members 71 to ensure the improved appearance property.

Further, the one-side exhaust pipe 61 and the other-side exhaust pipe 62, which extend underneath the front from the engine 11, change the directions in the bent portions 61*e* and 62*e* and extend downward to the rear. As viewed in the side view of the vehicle, the exhaust sensors 65 and 66 are arranged upward on a rear of the bent portions 61e and 62e.

With this configuration, the bent portions 61e and 62e can protect the exhaust sensors 65 and 66 from the underneath on the front, and chipping of the exhaust sensors 65 and 66 by, for example, jumping small stones can be prevented.

Note that it should be understood that the above-described embodiment is given to illustrate an aspect to which the present invention is applied, and the present invention is not limited to the above-described embodiment.

While in the above-described embodiment the exhaust sensors 65 and 66 have been described to overlap the engine hanger portions 51L and 51R, respectively as viewed in the front view of the vehicle, the present invention is not limited to this. In the exhaust sensors 65 and 66, it is only necessary that at least one of the exhaust sensors 65 and 66 overlaps the engine hanger portions 51L and 51R. For example, the exhaust sensors 65 and 66 may have a configuration where the exhaust sensor 65 overlaps the engine hanger portion 51L, and the exhaust sensor 66 does not overlap the engine hanger portion 51R.

Further, while the above-described embodiment has described the motorcycle 1 as an example, the present invention is not limited to this. The present invention is applicable to a three-wheeled saddle riding vehicle including two front wheels or rear wheels and a saddle riding vehicle including four wheels or more.

REFERENCE SIGNS LIST

1 . . . Motorcycle (saddle riding vehicle)
10 . . . Body frame
11 . . . Engine
40 . . . Radiator
40a and 40b . . . End edge
41b . . . Lower end portion
49 . . . Horn
51L and 51R . . . Engine hanger portion
53 . . . Fastening portion
54 . . . Engine fastener
61 . . . One-side exhaust pipe (exhaust pipe)
61a and 62a . . . Underneath extending pipe portion
61e and 62e . . . Bent portion
62 . . . Other-side exhaust pipe (exhaust pipe)
63 . . . Catalytic device
65 and 66 . . . Exhaust sensor
65a and 66a . . . Base end portion (outer end portion)
71 . . . Lower fastening member (fastening member)
75 . . . Recessed portion
76a, 76b, and 76c . . . Harness
77L and 77R . . . Inclined surface

The invention claimed is:

1. A saddle riding vehicle comprising:
a body frame;
an engine supported by the body frame;
an exhaust sensor that detects exhaust air of the engine; and
a radiator for the engine,
the engine being supported by an engine hanger portion disposed in the body frame,
wherein the exhaust sensor is disposed on an exhaust pipe of the engine at a position on a front with respect to the engine hanger portion and is positioned underneath the radiator,
at least a part of the exhaust sensor overlaps the engine hanger portion as viewed in a front view of a vehicle, the engine hanger portion includes a fastening portion fastened to the engine by inserting an engine fastener through the fastening portion, and
the exhaust sensor is arranged above the fastening portion.

2. The saddle riding vehicle according to claim 1, wherein the exhaust pipe comprises a pair of left and right exhaust pipes, the pair of left and right exhaust pipes is connected to the engine, and the exhaust sensor is respectively disposed on the pair of left and right exhaust pipes, and
the respective exhaust sensor is inserted into the pair of left and right exhaust pipes from outside in a vehicle width direction.

3. The saddle riding vehicle according to claim 2, wherein an outer end portion in the vehicle width direction of the exhaust sensor is positioned inside in the vehicle width direction with respect to an end edge outside in the vehicle width direction of the radiator.

4. The saddle riding vehicle according to claim 2, wherein a lower end portion of the radiator includes an inclined surface inclined underneath a front above the exhaust sensor.

5. The saddle riding vehicle according to claim 4, wherein the exhaust pipe includes an underneath extending pipe portion extending underneath the front from the engine,
the inclined surface is inclined underneath the front above the underneath extending pipe portion along the underneath extending pipe portion, and
the exhaust sensor is disposed on the underneath extending pipe portion.

6. The saddle riding vehicle according to claim 2, wherein the radiator is fastened to a vehicle body with a fastening member in
a front-rear direction, the fastening member being arranged between the pair of left and right exhaust pipes.

7. The saddle riding vehicle according to claim 1, wherein a horn is disposed underneath the exhaust sensor, and
the exhaust sensor is surrounded by the radiator, the engine hanger portion, and the horn.

8. The saddle riding vehicle according to claim 1, wherein a catalytic device that purifies exhaust air is disposed underneath the exhaust sensor, and
the exhaust sensor is surrounded by the radiator, the engine hanger portion, and the catalytic device.

9. The saddle riding vehicle according to claim 1, wherein a recessed portion is disposed on an upper surface of the radiator, and
a harness is piped in the recessed portion.

10. The saddle riding vehicle according to claim 1, wherein the exhaust pipe extending underneath the front from the engine changes directions in a bent portion and extend downward to a rear, and
the exhaust sensor is arranged upward on a rear of the bent portion as viewed in a side view of the vehicle.

11. A saddle riding vehicle comprising:
a body frame;
an engine supported by the body frame;
an exhaust sensor that detects exhaust air of the engine; and
a radiator for the engine,
the engine being supported by an engine hanger portion disposed in the body frame, wherein the exhaust sensor is disposed on an exhaust pipe of the engine at a position on a front with respect to the engine hanger portion and is positioned underneath the radiator, at least a part of the exhaust sensor overlaps the engine hanger portion as viewed in a front view of a vehicle, the exhaust pipe comprises a pair of left and right exhaust pipes, the pair of left and right exhaust pipes is connected to the engine, and the exhaust sensor is respectively disposed on the pair of left and right exhaust pipes, and the respective exhaust sensor is inserted into the pair of left and right exhaust pipes from outside in a vehicle width direction.

12. A saddle riding vehicle comprising:

a body frame;

an engine supported by the body frame;

an exhaust sensor that detects exhaust air of the engine; and a radiator for the engine, the engine being supported by an engine hanger portion disposed in the body frame, wherein the exhaust sensor is disposed on an exhaust pipe of the engine at a position on a front with respect to the engine hanger portion and is positioned underneath the radiator, at least a part of the exhaust sensor overlaps the engine hanger portion as viewed in a front view of a vehicle, a horn is disposed underneath the exhaust sensor, and the exhaust sensor is surrounded by the radiator, the engine hanger portion, and the horn.

13. A saddle riding vehicle comprising:

a body frame;

an engine supported by the body frame;

an exhaust sensor that detects exhaust air of the engine; and a radiator for the engine, the engine being supported by an engine hanger portion disposed in the body frame, wherein the exhaust sensor is disposed on an exhaust pipe of the engine at a position on a front with respect to the engine hanger portion and is positioned underneath the radiator, at least a part of the exhaust sensor overlaps the engine hanger portion as viewed in a front view of a vehicle, a recessed portion is disposed on an upper surface of the radiator, and a harness is piped in the recessed portion.

* * * * *